United States Patent Office 3,182,362
Patented May 11, 1965

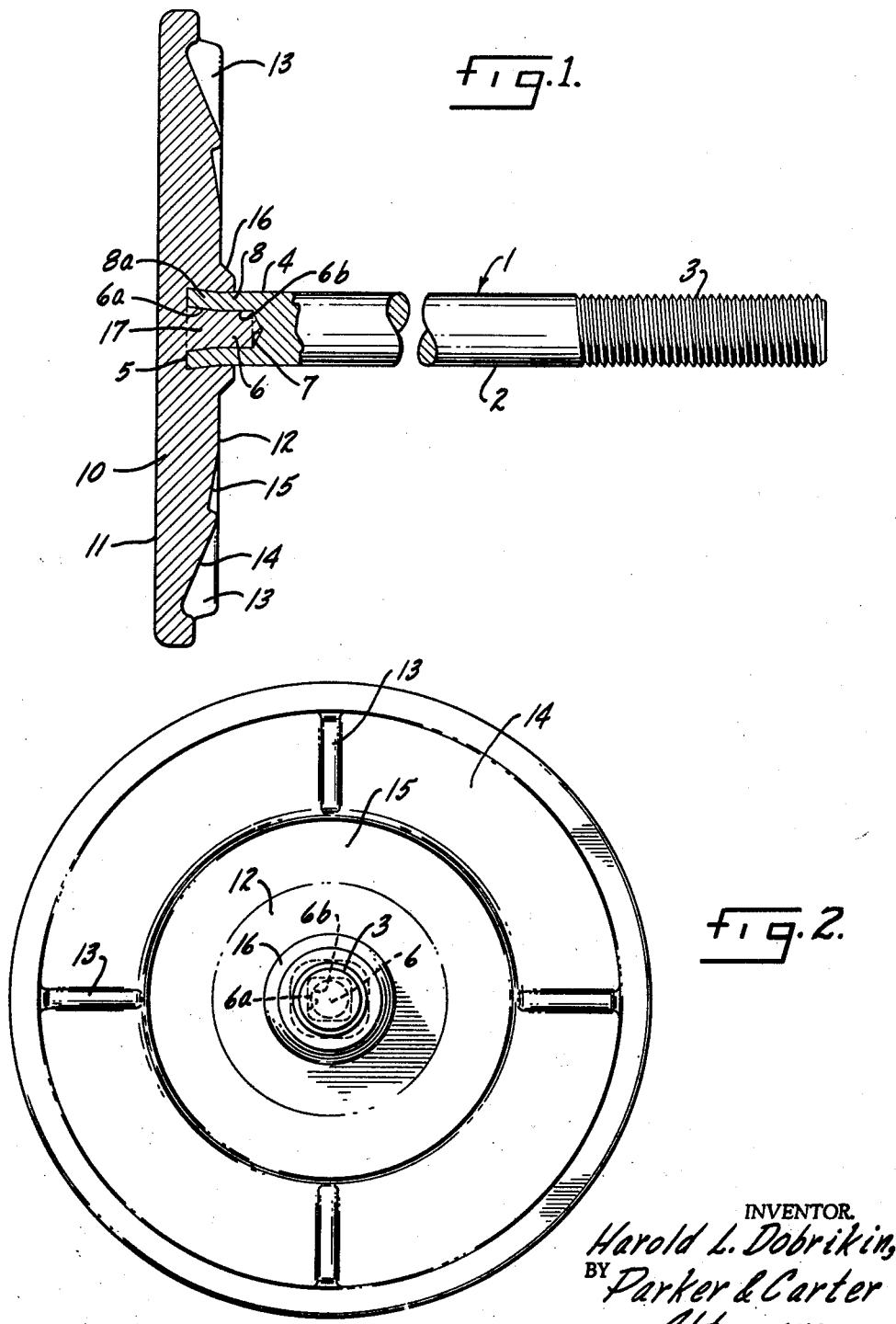

3,182,362
METHOD OF FORMING A MEMBER AND
SHAFT ASSEMBLY
Harold L. Dobrikin, Highland Park, Ill., assignor to Berg Airlectro Products Co., Chicago, Ill., a corporation of Illinois
Filed Dec. 12, 1961, Ser. No. 158,830
1 Claim. (Cl. 22—203)

This invention relates to a method of attaching metallic members, and has particular relation to a method of attaching a push plate to a shaft therefor.

Another purpose is to provide a method for securing together an aluminum push plate and a steel shaft.

Another purpose is to provide a method of attaching members formed of different metals.

Another purpose is to provide a method of securing a member to a shaft wherein the member is securely anchored to the shaft.

Another purpose is to provide a method of attaching a member to a shaft wherein a portion of the attached member is employed to strengthen said shaft.

Another purpose is to provide a member and shaft assembly wherein the member and shaft thereof are securely joined together without the employment of additional members such as threaded elements or weldments.

Other purposes will appear from time to time during the course of the specification and claim.

I illustrate my invention more or less diagrammatically in the accompanying drawings, wherein:

FIGURE 1 is a side elevation in partial cross section; and

FIGURE 2 is an end view.

Like parts are indicated by like numerals throughout the specification and drawings.

Referring now to the drawings, and particularly to FIGURE 1 thereof, numeral 1 generally indicates a shaft which may, for example, be formed of steel. The shaft 1 has a generally cylindrical outer surface 2 and an end portion 3 which may be internally or externally threaded or hollowed to provide for suitable attachment of additional mechanism. Since the mechanism to be attached to the shaft end portion 3 forms no part of the present invention, it will not be further referred to herein.

The opposite end portion 4 of shaft 1 has its end face 5 centrally drilled to form an axial well 6. The base of the well 6 may be conical, as illustrated at 7.

The formation of the well 6 in the end face 5 of shaft 1 results in the creation of a circumferential wall segment 8. The segment 8 is then flared, by employment of any suitable flaring tool, to produce an outwardly conical end portion 8a.

The shaft end portion 4 thus has an outer diameter of gradually increasing dimension from a point beyond the bottom 7 of well 6 toward the end face 5.

The shaft 1 is then placed in a suitable die-casting die with the end portion 4 positioned for contact with metal to be cast in said die. I illustrate, for example, the aluminum push plate 10. The plate 10 is cast about and in interpenetrating relationship with the end 4 of shaft 1. The particular plate 10 has a relatively flat, smooth end face 11 and a back face 12. The back face 12 may have a plurality of circumferentially spaced ridges or fingers 13 cast therein and a plurality of radially spaced annular surfaces angularly inclined with respect to the plane of face 11, as indicated at 14, 15. At the center of the back face 12 and axially surrounding the shaft end 4, a boss or abutment 16 may be cast. A portion of the metal forming the plate 10 in the casting operation flows into and fills the well 6, as indicated at 17. It will be observed that the plate, as indicated at 16, is of sufficient thickness to enclose the flared portion 8a of the wall 8 therewithin, and that the plate portion 17 completely fills the well 6. Thus, also, the entire outer circumference of the flare portion 8a, and a portion of the circumferential outer surface of the shaft end wall 8, are in contact with the metal of plate 10, and the entire inner surface of the well 6, including the outwardly flared wall portion 6a and the generally circumferential wall portion 6b, are in contact with the metal of plate 10.

Thus, the flare of the shaft securely anchors the shaft within the cast member 10 so that the shaft cannot be pulled loose therefrom. The drilled end portion or well 6 of shaft 1 is completely filled with the metal of the cast member 10 in compensation for the loss of strength imposed upon the shaft when the metal was removed to form the well 6 in the drilling operation.

As seen in dotted lines in FIGURE 2, the flaring of the end wall 8 of shaft 1 may produce a segment having a comparatively rectilinear outer configuration with rounded corners. Whatever cross-sectional form the flared wall portion 8a may take, it will be understood that the presence of the metal of the cast member 10, both within and without the flare portion 8a, is effective to prevent removal of the shaft from the cast member 10 and to prevent a return of the flared portion 8a to its original configuration.

Although a preferred embodiment of the invention has been illustrated and described, it will be understood that further modifications will suggest themselves to those skilled in the art upon a reading of the foregoing specification. Accordingly, the foregoing description should be taken as merely illustrative and not definitive, and the scope of the invention should be limited only by the following appended claim.

I claim:

The method of attaching a solid shaft to a plate which comprises the steps of drilling an end face of said shaft in axial alignment with said shaft to form an outwardly open well therein of sufficient depth to extend inwardly beyond the entire rear surface of said plate when said plate is attached to said shaft, thereafter flaring an outer end portion of the resulting wall surrounding said well to form an outwardly flared portion at said end of said shaft, forming said outer end portion of said wall in a continuous rectilinear cross-sectional configuration having inwardly tapering side walls and a maximum width greater than the diameter of said shaft, and thereafter casting said plate about said flared portion and about an adjacent circumferential portion of said resulting wall and causing the metal of said plate completely to fill said well in contact with all inner surfaces of said well and to surround said flared portion in contact with the entirety of the inner and outer surfaces thereof.

References Cited by the Examiner
UNITED STATES PATENTS

| | | | |
|---|---|---|---|
| 391,456 | 10/88 | Cross. | |
| 1,250,601 | 12/17 | Littmann. | |
| 1,290,529 | 1/19 | Ellery | 22—203 |
| 1,468,559 | 9/23 | Crimp | 22—203 |
| 1,842,110 | 1/32 | Osterholm | 29—156.7 |
| 1,977,846 | 10/34 | Febrey | 287—20.2 |
| 2,101,917 | 12/37 | Plater | 29—156.7 |
| 2,779,612 | 1/57 | Edelen | 287—20.2 |

FOREIGN PATENTS 593,982   10/47   Great Britain.

JOHN F. CAMPBELL, Primary Examiner.
WHITMORE A. WILTZ, Examiner.